(12) United States Patent
Jahn

(10) Patent No.: US 8,794,632 B2
(45) Date of Patent: Aug. 5, 2014

(54) LEAF SEAL ASSEMBLY

(75) Inventor: Ingo H. J. Jahn, Derby (GB)

(73) Assignee: Rolls-Royce PLC, London (GB)

( * ) Notice: Subject to any disclaimer, the term of this patent is extended or adjusted under 35 U.S.C. 154(b) by 114 days.

(21) Appl. No.: 12/964,086

(22) Filed: Dec. 9, 2010

(65) Prior Publication Data

US 2011/0148046 A1 Jun. 23, 2011

(30) Foreign Application Priority Data

Dec. 18, 2009 (GB) .................................. 0922074.0

(51) Int. Cl.
*F01D 11/02* (2006.01)
*F16J 15/32* (2006.01)

(52) U.S. Cl.
CPC .................................. *F16J 15/3292* (2013.01)
USPC ...... 277/355; 277/303; 415/174.1; 415/174.2

(58) Field of Classification Search
USPC ........................................ 277/355; 415/174.2
See application file for complete search history.

(56) References Cited

U.S. PATENT DOCUMENTS

| 6,736,597 | B2 * | 5/2004 | Uehara et al. ............... | 415/174.2 |
| 6,874,788 | B2 * | 4/2005 | Kono ............................. | 277/355 |
| 7,226,053 | B2 * | 6/2007 | Nakano et al. ................. | 277/355 |
| 7,261,515 | B2 * | 8/2007 | Nishimoto et al. ......... | 415/174.2 |
| 7,744,092 | B2 * | 6/2010 | Mortzheim .................... | 277/303 |
| 7,828,297 | B2 * | 11/2010 | Hoebel et al. ................. | 277/412 |
| 8,025,296 | B2 * | 9/2011 | Uehara et al. ................. | 277/412 |
| 2005/0194745 | A1 | 9/2005 | Hogg | |
| 2007/0120326 | A1 * | 5/2007 | Rhodes et al. ................ | 277/355 |
| 2008/0007009 | A1 * | 1/2008 | Williams ....................... | 277/355 |
| 2008/0099999 | A1 * | 5/2008 | Williams ....................... | 277/355 |
| 2008/0107525 | A1 * | 5/2008 | Adis et al. ..................... | 415/230 |
| 2008/0169614 | A1 | 7/2008 | Awtar et al. | |
| 2009/0243221 | A1 | 10/2009 | Olmes et al. | |
| 2009/0309311 | A1 | 12/2009 | Verma et al. | |
| 2009/0322035 | A1 * | 12/2009 | Wright .......................... | 277/431 |
| 2010/0143102 | A1 * | 6/2010 | Deo et al. ..................... | 415/173.1 |
| 2010/0320697 | A1 * | 12/2010 | Kono ............................. | 277/355 |

FOREIGN PATENT DOCUMENTS

| EP | 1 479 951 A2 | 11/2004 |
| EP | 1 479 952 A3 | 11/2004 |
| EP | 1 489 340 A1 | 12/2004 |
| EP | 1 626 210 A1 | 2/2006 |

(Continued)

OTHER PUBLICATIONS

British Search Report dated Mar. 18, 2010 in British Patent Application No. GB0922074.0.

(Continued)

*Primary Examiner* — Kristina Fulton
*Assistant Examiner* — Eugene G Byrd
(74) *Attorney, Agent, or Firm* — Oliff PLC

(57) ABSTRACT

A leaf seal assembly (20) for providing a seal between a first member and a second member (10), the leaf seal assembly comprising a plurality of leaf elements (22) and a first substantially planar cover plate (24a), the leaf elements being arranged in a pack, with a first edge of each leaf element being adjacent to the first cover plate, wherein each leaf element comprises a first shoulder (30a) in the first edge, the first shoulder being arranged so as to form a first gap (28a) between the first edge of each leaf element and the first cover plate over a portion of the first edge.

15 Claims, 3 Drawing Sheets

(56) References Cited

FOREIGN PATENT DOCUMENTS

| | | |
|---|---|---|
| EP | 1 878 955 A1 | 1/2008 |
| EP | 2 105 640 A1 | 9/2009 |
| FR | 2 915 548 A1 | 10/2008 |

OTHER PUBLICATIONS

Search Report issued in European Patent Application No. 10 19 4290 dated Mar. 28, 2011.

* cited by examiner

LEAF SEAL ASSEMBLY

This invention relates to a leaf seal assembly and particularly but not exclusively relates to a leaf seal assembly for a gas turbine engine.

Typically, leaf seals are formed from sections of leaf material appropriately presented in order to create a seal surface from juxtaposed seal edges of respective leaves in an assembly. In particular, the leaves may be arranged circumferentially about a rotating shaft in order to present the seal edges and therefore the seal surface towards that shaft so as to provide a seal barrier. The seal edges effectively float relative to a rotating surface. Therefore, a leaf seal may also accommodate variations in the radial and axial location of the shaft.

It will be appreciated that assembly of leaf seals is relatively complex in terms of the number of leaves in the assembly and the importance of correctly aligning and spacing the leaves in order to achieve the best effect. A typical leaf seal disposed about a shaft 10 is shown in FIGS. 1a and 1b. (NB, for the sake of simplicity, the end on view of the shaft in FIG. 1b is shown to be straight as opposed to circular.) The leaves 2 are disposed between cover plates 4. The leaves 2 are joined to one another and the cover plates 4 at a root 6 of each leaf. Beyond the root 6, there is a gap 8 between the cover plates 4 and the leaves 2.

Varying the front (upstream) and rear (downstream) gaps 8, or the ratio between them, has an impact on seal blow down and blow up. An incorrect gap ratio can lead to excessive blow down, which leads to seal wear, or excessive blow up, which cause seal leakage. Accurate sizing of the gaps is therefore desirable.

In known leaf seals, the gap 8 between the leaf pack and the cover plates is set by machining a step 12 into the cover plate 4. The height of this step at its inner radius is used to control the gap between cover plate and leaf pack. The precision of the gap is influenced by two factors: the accuracy to which the step is machined into the cover plate, and the variation in leaf pack axial width as illustrated in FIG. 2.

With respect to the first factor, experience suggests that it is hard to accurately machine the step, as the ring (which forms the cover plate) deforms while machining, especially when the seal is relatively large, as in the case of a gas turbine engine. In addition there is the typical process variation inherent to the machining process. Thus, due to the way the leaf seal is assembled, an error in step height will lead to a constant off-set, o, in the gap width, g.

With respect to the second factor, the variation in leaf axial width depends on the manufacturing process chosen and on how accurately the leaves are placed together. The variation in gap introduced will be between zero and the maximum variation in leaf gap. The mean effect will be an extra offset equal to half of the variation in the leaf pack width, w.

As a result of these two factors, the average additional gap, Δg, is as follows:

$$\Delta g = o + 0.5w,$$

where o is the machining off-set error and w the variation in the leaf pack width. The combined effect of these two factors can cause an unsatisfactory variation in the gap and the present invention therefore seeks to address this.

According to a first aspect of the present invention there is provided a leaf seal assembly for providing a seal between a first member and a second member, the leaf seal assembly comprising a plurality of leaf elements and a first substantially planar cover plate, the leaf elements being arranged in a pack, with a first edge of each leaf element being adjacent to the first cover plate, wherein each leaf element comprises a first shoulder in the first edge, the first shoulder being arranged so as to form a first gap between the first edge of each leaf element and the first cover plate over a portion of the first edge.

Each leaf element may comprise a root portion and a sealing portion. The first shoulder may be formed at the boundary between the root portion and the sealing portion.

The leaf assembly may comprise a second substantially planar cover plate with a second edge of each leaf element which may be adjacent to the second cover plate such that the leaf elements are sandwiched between the first and second cover plates. Each leaf element may comprise a second shoulder in the second edge. The second shoulder may be arranged so as to form a second gap between the second edge of each leaf element and the second cover plate over a portion of the second edge.

Each leaf element may comprise a root portion and a sealing portion. The second shoulder may be formed at the boundary between the root portion and the sealing portion.

The pack of leaf elements may be arranged circumferentially about the first member. The first and second members may rotate with respect to one another.

A turbomachine may comprise a leaf seal assembly as described above. A gas turbine may comprise a leaf seal assembly as described above.

According to a second aspect of the present invention there is provided a method of manufacturing a leaf seal assembly, the method comprising: providing a plurality of leaf elements and a first substantially planar cover plate; forming a first shoulder in the first edge of each leaf element; and arranging the leaf elements with a first edge of each leaf element being adjacent to the first cover plate; such that the first shoulder is arranged so as to form a first gap between the first edge of each leaf element and the first cover plate over a portion of the first edge.

The method may comprise: providing a second substantially planar cover plate. The method may further comprise forming a second shoulder in a second edge of each leaf element. The method may further still comprise arranging the leaf elements with the second edge of each leaf element being adjacent to the second cover plate such that the leaf elements may be sandwiched between the first and second cover plates, and that the second shoulder may be arranged so as to form a second gap between the second edge of each leaf element and the second cover plate over a portion of the second edge.

For a better understanding of the present invention, and to show more clearly how it may be carried into effect, reference will now be made, by way of example, to the accompanying drawings, in which.

Figure 3A:
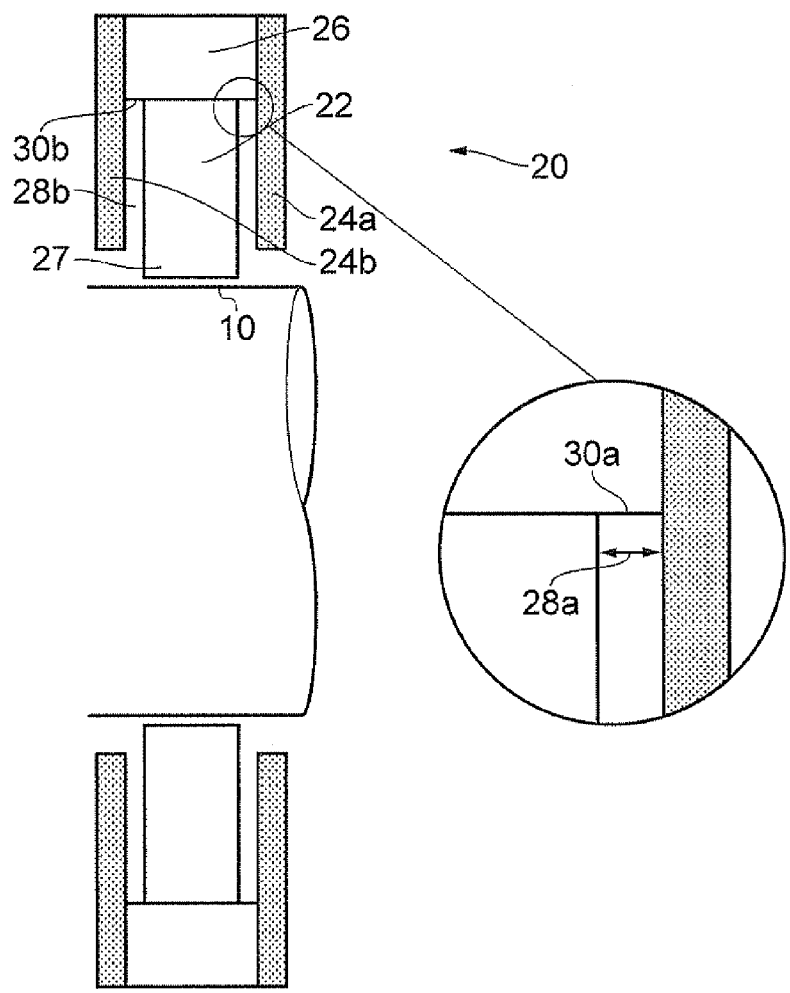
FIGS. 3a and 3b show sectional views of a leaf assembly according to an example of the present invention. (For simplicity, FIG. 3b shows the pack in a straight seal.)
Figure 3B:
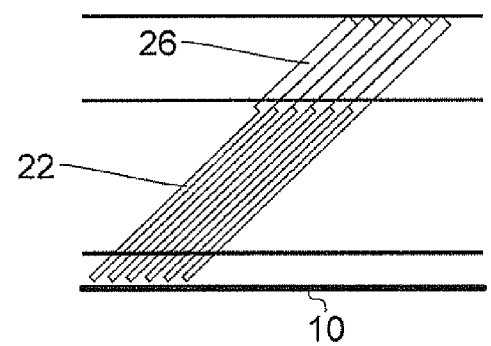

With reference to FIGS. 3a and 3b, a leaf seal assembly 20 according to an embodiment of the present invention, comprises a plurality of leaf elements 22 sandwiched between substantially planar first and second cover plates 24a, 24b and is disposed about a shaft 10. As is shown in FIG. 3b the leaf elements are joined together at a root portion 26. However, for the sake of simplicity, the end on view of the shaft in FIG. 3b is shown to be straight as opposed to circular. Nevertheless, the leaf elements 22 are disposed about the circumference of the shaft 10 and the leaf elements are angled with respect to the radial direction.

The leaf elements are arranged in a pack, with a first edge of each leaf element being adjacent to the first cover plate 24a and a second edge of each leaf element being adjacent to the second cover plate 24b, such that the leaf elements are sandwiched between the first and second cover plates.

Each leaf element comprises a first shoulder 30a in the first edge and a corresponding second shoulder 30b in the second edge. The first shoulder 30a is arranged so as to form a first gap 28a between the first edge of each leaf element and the first cover plate 24a over a portion of the first edge. Similarly, the second shoulder 30b is arranged so as to form a second gap 28b between the second edge of each leaf element and the second cover plate 24b over a portion of the second edge.

Each leaf element comprises the root portion 26 and a sealing portion 27. The first and second shoulders 30a, 30b are formed at the boundary between the root portion and the sealing portion. The cover plates 24a, 24b are raised away from the leaf pack by a step change in the leaf edge profiles. Thus, the gaps 28a, 28b are set by the design of the leaf pack and in contrast to the prior art, the cover plates consist of flat planar rings.

The present invention is advantageous due to the reduction in the cost of manufacturing the cover plates, as the step machining process is eliminated (the cover plates may be cut from sheet material). Furthermore, the accuracy to which the leaf pack to cover plate gap can be controlled, has been increased considerably.

Figure 1A:
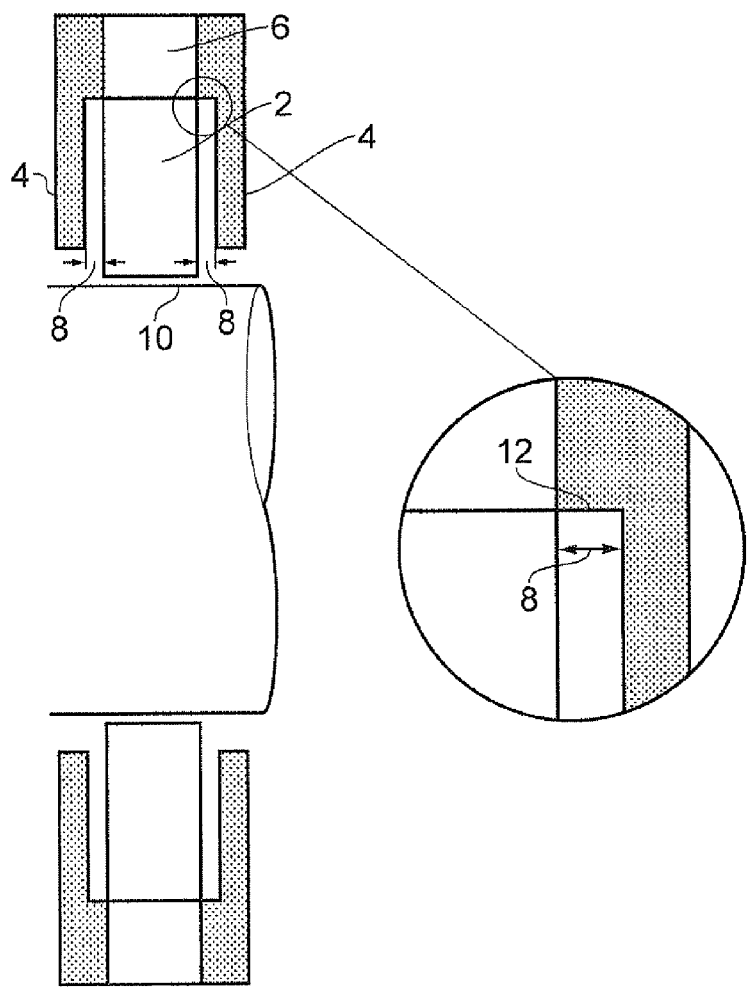
FIGS. 1a and 1b show sectional views of a prior art leaf seal assembly. (For simplicity, FIG. 1b shows the pack in a straight seal.)
Figure 1B:
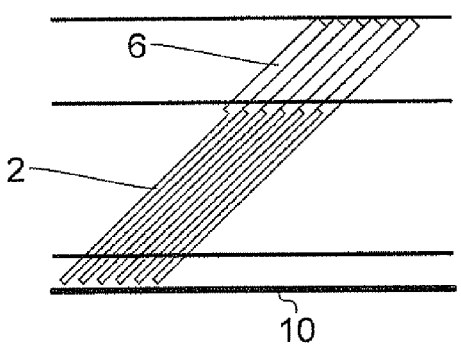
Figure 2:
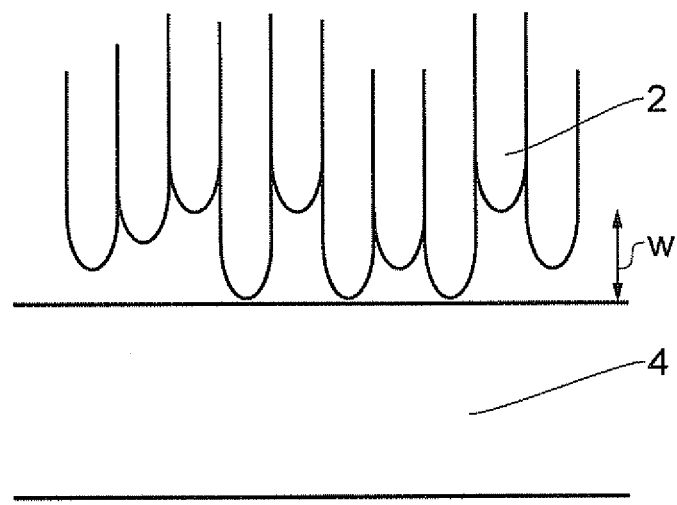
FIG. 2 shows a top view of a leaf pack of a prior art leaf seal assembly.

With the present invention, the gap precision is influenced by the following factors: the accuracy of the step (i.e. shoulders 30a, 30b), which is part of the leaf edge profile, and the variation in leaf pack axial width as illustrated in FIG. 2.

With respect to the first factor, the variation in the step can be tightly controlled as part of the leaf manufacture. In addition, as the gap is set by a large number of leaves, the gap variation depends on the mean height of the step. If the process for manufacturing the leaves is centred on zero off-set, this results in a constant off-set of zero for the gap. Otherwise, the manufacturing offset will cause a mean gap variation of half the long-term mean of the offset.

With respect to the second factor, the variation in leaf axial width depends on the manufacturing process chosen and on how accurately the leaves are placed together. The variation in gap introduced will be between zero and the maximum variation in leaf gap. The mean effect will be an extra offset equal to half of the variation in the leaf pack width.

As a result of these two factors, the average additional gap, $\Delta g$, for the present invention is as follows:

$$\Delta g = 0.5l + 0.5w,$$

where l is the long term mean offset for leaf manufacture and w the variation in the leaf pack width. From the above equation, it can be seen that the main contributor to the prior art variation in gap between leaf pack and cover plate has been eliminated and replaced by a factor which disappears for a well controlled manufacturing process. The present invention therefore increases the accuracy of the gap and mitigates the aforementioned disadvantages.

The invention claimed is:

1. A leaf seal assembly for providing a seal between a first member and a second member, the leaf seal assembly comprising:
a plurality of leaf elements, the leaf elements being arranged in a pack, the pack arranged in a circumferential direction about the first member, each leaf element extending in a generally radial direction and having a width in an axial direction perpendicular to the radial direction and to the circumferential direction,
a first cover plate, the first cover plate having a substantially total length that is substantially planar in the radial and circumferential directions,
a first generally radially-extending edge of each leaf element being adjacent to the first cover plate,
wherein each leaf element comprises a root portion, a sealing portion and a first shoulder formed at a boundary between the root portion and the sealing portion, the first shoulder being in the first edge, the first shoulder extending in the axial direction so as to define a first shoulder edge parallel to the first edge,
the first shoulder edge abutting and directly contacting the first cover plate such that a width of the first shoulder defines a first gap between the first edge of each leaf element and the first cover plate over a portion of the first edge, wherein the root portion and the sealing portion are integrally formed as a unitary structure.

2. A leaf seal assembly according to claim 1, wherein each leaf element comprises a root portion and a sealing portion, the first shoulder being formed at the boundary between the root portion and the sealing portion.

3. A leaf seal assembly according to claim 1, wherein the leaf assembly comprises:
a second cover plate that is substantially planar in the radial and circumferential directions;
a second generally radially-extending edge of each leaf element being adjacent to the second cover plate such that the leaf elements are sandwiched between the first and second cover plates,
wherein each leaf element comprises a second shoulder in the second edge, the second shoulder extending in the axial direction so as to define a second shoulder edge parallel to the second edge,
the second shoulder edge abutting the second cover plate such that a width of the second shoulder defines a second gap between the second edge of each leaf element and the second cover plate over a portion of the second edge.

4. A leaf seal assembly according to claim 3, wherein each leaf element comprises a root portion and a sealing portion, the second shoulder being formed at the boundary between the root portion and the sealing portion.

5. A leaf seal assembly according to claim 1, wherein the first and second members rotate with respect to one another.

6. A turbomachine comprising a leaf seal assembly as claimed in claim 1.

7. A gas turbine comprising a leaf seal assembly as claimed in claim 1.

8. A method of manufacturing a leaf seal assembly for providing a seal between a first member and a second member, the method comprising:
providing a plurality of leaf elements extending in a generally radial direction and having a width in an axial direction perpendicular to the radial direction and to the circumferential direction, the leaf elements being arranged in a pack, and the pack being arranged circumferentially about the first member, wherein each leaf element comprises a root portion and a sealing portion integrally formed as a unitary structure;
providing a first cover plate having a substantially entire length that is substantially planar in the radial and circumferential directions;
forming a first shoulder at a boundary between the root portion and the sealing portion and in an axial direction so as to define a first shoulder edge parallel to the first edge of each leaf element; and arranging the leaf elements with the first edge of each leaf element being adjacent to the first cover plate such that a width of the first shoulder abuts and directly contacts the first cover plate and defines a first gap between the first edge of each leaf element and the first cover plate over a portion of the first edge.

9. A method of manufacturing a leaf seal assembly as claimed in claim 8, wherein the method further comprises:

providing a second substantially planar cover plate that is substantially planar in the radial and circumferential directions, forming a second shoulder in an axial direction so as to define a second shoulder edge parallel to a second edge of each leaf element; and arranging the leaf elements with the second edge of each leaf element being adjacent to the second cover plate such that the leaf elements are sandwiched between the first and second cover plates, and such that the second shoulder abuts the second cover plate such that a width of the second should defines a second gap between the second edge of each leaf element and the second cover plate over a portion of the second edge.

10. A leaf seal assembly according to claim 1, wherein the first shoulder of each leaf element is integrally formed as a unitary structure with the leaf element.

11. A leaf seal assembly according to claim 3, wherein the second shoulder of each leaf element is integrally formed as a unitary structure with the leaf element.

12. A leaf seal assembly according to claim 8, wherein the first shoulder of each leaf element is integrally formed as a unitary structure with the leaf element.

13. A leaf seal assembly according to claim 9, wherein the second shoulder of each leaf element is integrally formed as a unitary structure with the leaf element.

14. A leaf seal assembly for providing a seal between a first member and a second member, the leaf seal assembly comprising:

a plurality of leaf elements, wherein each leaf element comprises a root portion and a sealing portion integrally formed as a unitary structure; and a cover plate, the leaf elements being arranged in a pack with an edge of each leaf element being adjacent to and directly contacting the cover plate, wherein each leaf element comprises a shoulder at a boundary between the root portion and the sealing portion and in the edge, the shoulder extending in an axial direction so as to define a shoulder edge parallel to the edge, and the shoulder edge has a width that defines a gap between the edge of each leaf element and the cover plate.

15. A leaf assembly according to claim 14, wherein the cover plate has a substantially entire length that is substantially planar in a radial and circumferential direction.

* * * * *